Nov. 18, 1969  C. W. ALPEN  3,478,794
BROCCOLI TRIMMER
Filed Dec. 13, 1967  5 Sheets-Sheet 1
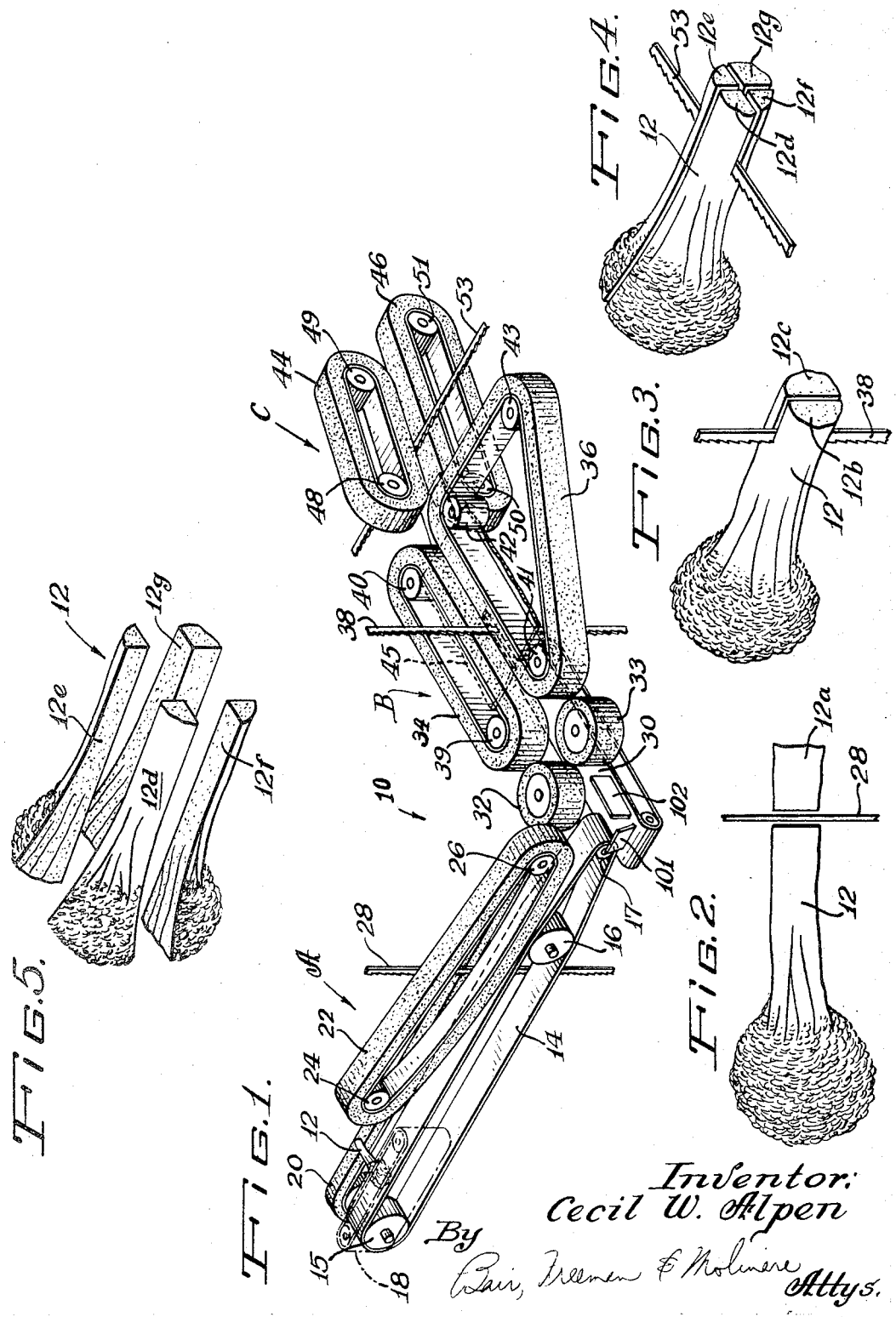
Inventor:
Cecil W. Alpen
By
Bair, Freeman & Molinare Attys.

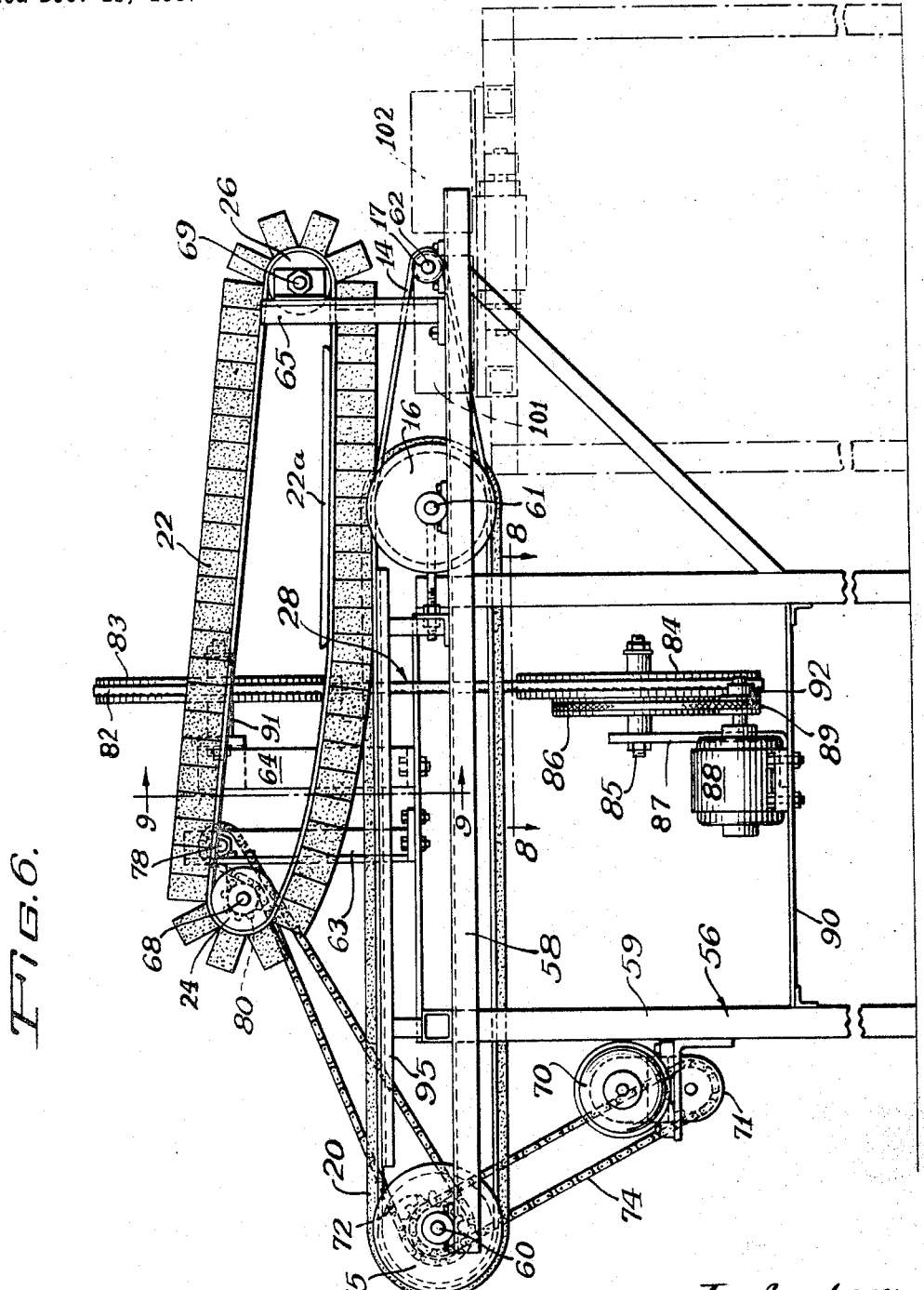

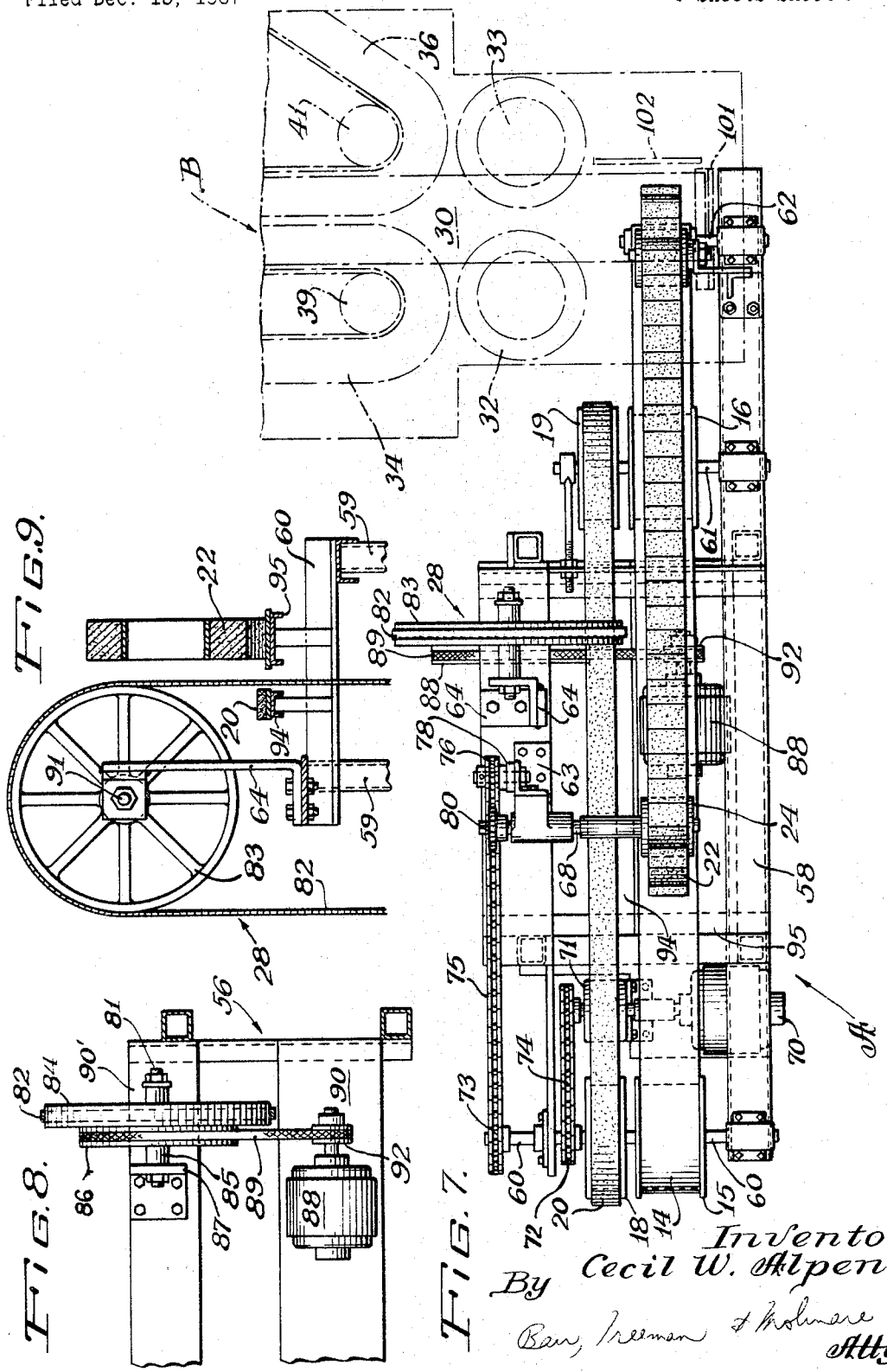

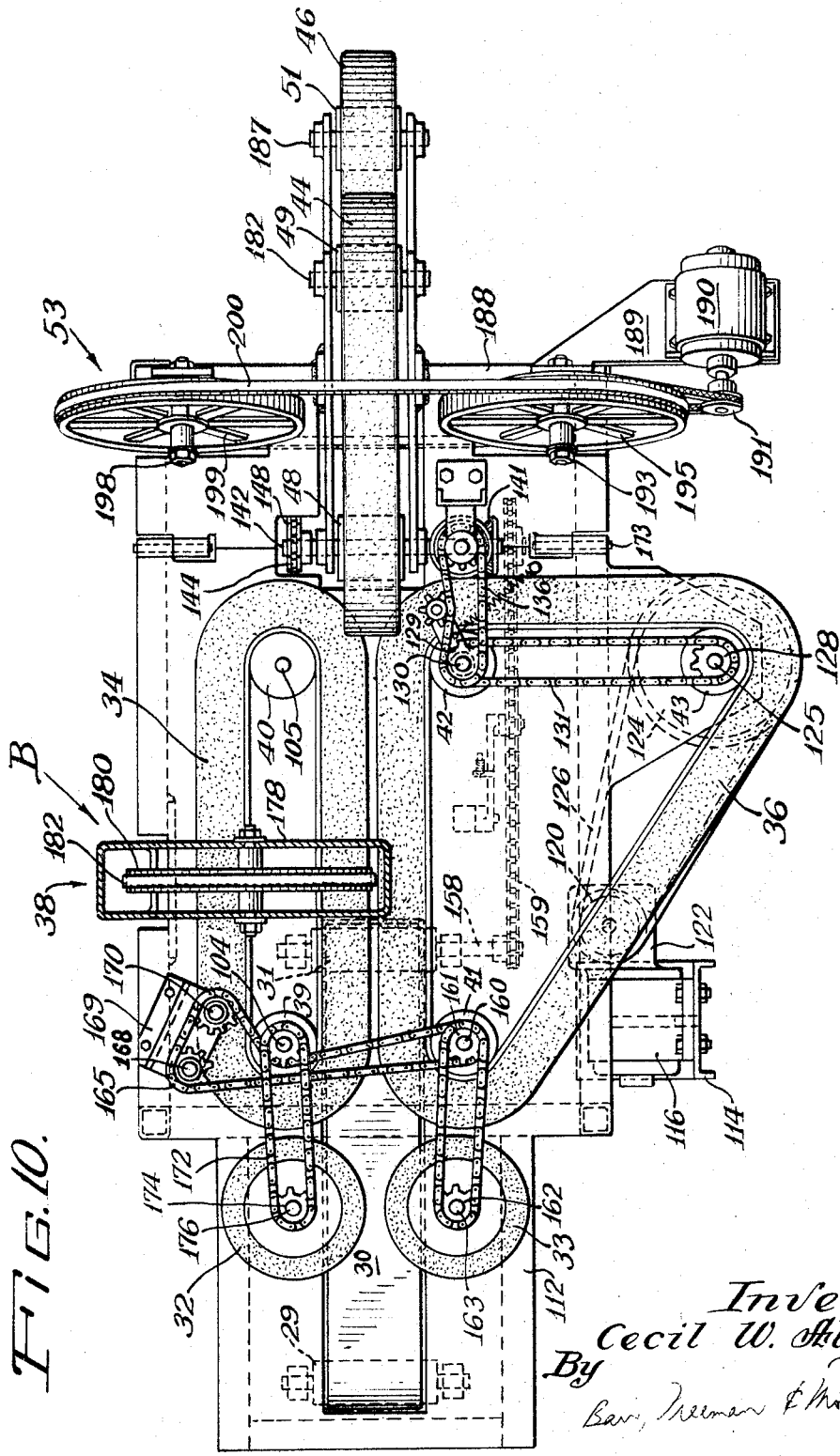

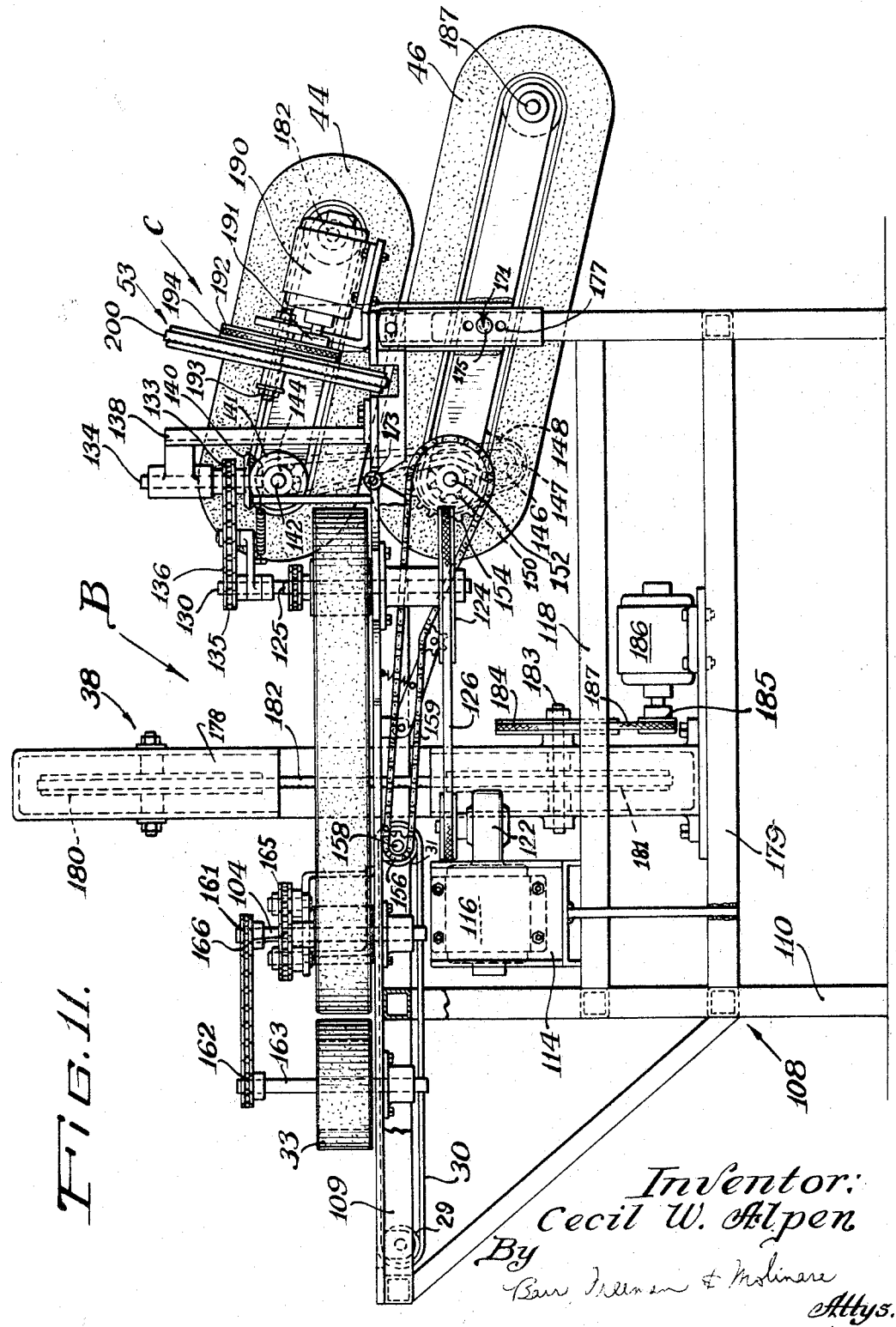

United States Patent Office
3,478,794
Patented Nov. 18, 1969

3,478,794
BROCCOLI TRIMMER
Cecil W. Alpen, Aptos, Calif., assignor to Green Giant Company, Le Sueur, Minn., a corporation of Minnesota
Filed Dec. 13, 1967, Ser. No. 690,115
Int. Cl. A23n 15/04
U.S. Cl. 146—78                                    11 Claims

ABSTRACT OF THE DISCLOSURE

A vegetable cutting machine including three operating stations for cutting elongated vegetables into lengthwise quarters. The vegetable is retained between a pair of cooperating conveyors at a butt cutting station where the end of the vegetable stalk is cut. From the butt cutting station, the vegetable is fed to a vegetable halving station where it is retained between vertically-disposed flights of a pair of cooperating conveyors and the vegetable is cut lengthwise into halves by a cutter operative between the conveyors. The vegetable is then fed to a vegetable quartering station where it is retained by a pair of cooperating conveyors having flights disposed at an angle with respect to a horizontal plane and cut into quarters lengthwise by a cutter operative between the conveyors.

Background of the invention

In the art of vegetable processing, it is desirable that certain vegetables, as for example, broccoli, be cut and quartered lengthwise for freezing or the like. The handling of broccoli is made difficult due to the fact that the vegetable comprises an elongated stalk and a compact swollen influorescence defining an enlarged, rather fragile head extending therefrom. In the past, the cutting of the broccoli to appropriate length and the halving and then quartering of the vegetable has been accomplished by hand. This is obviously a laborious and tedious task requiring considerable manpower. The cost of such manual food processing is relatively high.

A machine has been proposed for cutting broccoli into quarters which accepts broccoli stems one at a time and effects halving and then quartering of the broccoli stem by sequentially operative reciprocating knives. Production on this machine is relatively slow.

An object of the present invention is to provide an automated vegetable cutting device for cutting elongated vegetables, such as broccoli, comprising a first operating station for cutting the butt end of the stalk, a second operating station for cutting the vegetable in half lengthwise, and a third operating station for cutting each of the half sections into lengthwise halves, resulting in lengthwise quartering of the vegetable, such device being operative in a continuous manner at a relatively high rate of speed.

Another object of the present invention is to provide a vegetable cutting machine for cutting elongated vegetables into lengthwise quarters having at least two operating stations which include a pair of cooperating elongated conveyors having resilient surfaces which are capable of supporting the vegetable in such manner that the fragile influorescence or head is not damaged during the cutting operations, and the cut quarters are uniform. Other objects and advantages of the present invention will become more apparent hereinafter.

Brief description of the drawing

A presently preferred embodiment of the present invention is illustrated in the attached drawing wherein:

FIG. 1 is a schematic view of the vegetable cutting machine of the present invention illustrating the first operating station wherein the butt end of the stalk is cut, the second operating station wherein the vegetable is cut lengthwise into halves, and the third operating station wherein the vegetable is quartered;

FIG. 2 is a view illustrating the cutting of the butt end from a broccoli stalk;

FIG. 3 is a view illustrating the lengthwise halving of broccoli by a first cutter;

FIG. 4 is a view illustrating the cutting of broccoli into quarters by a second cutter disposed at right angles to the first cutter;

FIG. 5 illustrates broccoli cut into quarters;

FIG. 6 is a side elevation view of the butt cutting station of the vegetable cutting machine of the present invention;

FIG. 7 is a plan view of the butt cutting station of the vegetable cutting machine;

FIG. 8 is a detail view taken generally along the 8—8 of FIG. 6 and illustrates the drive mechanism for the cutter for cutting the butt of the stalk of broccoli;

FIG. 9 is a detail view taken generally along the line 9—9 of FIG. 6 and illustrates the cooperative relationship between the cutter at the butt cutting station and the cooperating conveyors for supporting the vegetable to be processed;

FIG. 10 is a plan view illustrating the halving and quartering operating stations; and FIG. 11 is a side view illustrating the halving and quartering operating stations of the vegetable cutting machine.

Description of the preferred embodiment

Referring now to FIG. 1 there is illustrated schematically the vegetable cutting machine 10 of the present invention. Basically, the vegetable cutting machine 10 comprises a first operating station A where the butt end of the vegetable to be processed is cut from the stalk, a second operating station B where the elongated vegetable, for example, broccoli, is cut in half while being retained by a pair of cooperating conveyors and a third operating station C wherein the halves of the vegetable are retained in appropriate position by a pair of cooperating conveyors for quartering.

Each broccoli stem 12 is fed onto the conveyor 14 at the first operating station A. The conveyor 14 is comprised of an endless flexible belt disposed such that the upper flight moves in a substantially horizontal plane about rollers 15, 16 and 17. Carried on a pair of rollers mounted on the same shafts respectively, as rollers 15 and 16 in closely spaced relationship to conveyor 14 is a conveyor belt 20. The belt 20 raises the end of the stalk or stem so that it can be cut square by the cutter 28. Adjustable feed gauge means 18 may be provided to increase or decrease the length of broccoli stem. Such means may comprise an endless belt trained over a pair of rollers for movement at right angles to the plane of movement of the upper flight of belt 14. The belt of the feed gauge is adjustable toward and away from conveyor belt 14. Disposed above the belt 14 and cooperating therewith is a conveyor belt 22 which is trained over a pair of rollers 24 and 26. The conveyors 14 and 22 cooperate to retain the broccoli therebetween in a substantially horizontal disposition. The surface of conveyor 22 is resilient and may be formed from spongy rubber or plasic foam bonded or otherwise secured to a flexible endless belt in order to minimize damage to the relatively tender vegetable. The broccoli is moved to the right as viewed in FIG. 1 by the conveyors 14 and 22 past the cutter member 28 which severs the butt end of the stalk. FIG. 2 illustrates the severing of the butt end 12a of the broccoli stalk at operating station A. The endless belt 20 is adapted to carry off the butt 12a to a suitable receptacle.

The broccoli 12 from which the butt end of the stalk has been cut is fed from the first operating station A to the second operating station B where it is received upon a conveyor belt 30 disposed generally at right angles to the axis of movement of the conveyor belts 14 and 22. Guide plates 101 and 102 assist the transfer of the vegetables from station A to station B. The broccoli 12 is fed between guide pulleys or rollers 32 and 33 which have the exteriors thereof covered with a soft resilient material, as for example, sponge rubber or plastic foam, such as polyurethane foam. The broccoli is fed between a pair of endless conveyors 34 and 36 which have resilient coverings for securely gripping the broccoli without injuring the heads thereof. The cooperating flights of conveyors 34 and 36 move the broccoli to the right as viewed in FIG. 1 into the cutter means 38 which cuts the broccoli stem 12 lengthwise (as indicated in FIG. 3) so as to cut the broccoli into halves 12b and 12c. Since the broccoli is centered between the cooperating flights of conveyors 34 and 36, the cutter means 38 will cut through the center of the broccoli. The conveyor belt 34 is trained over a pair of rollers 39 and 40, mounted for rotation about vertical axes, and the conveyor belt 36 is trained over three rollers 41, 42, 43 mounted for rotation about vertical axes. The cooperating flights of the conveyors 34 and 36 move in substantially vertical planes spaced closely adjacent one another so as to retain the broccoli therebetween and the cutter means 38 is movable in substantially a vertical plane to effect halving of the broccoli 12. The exterior surfaces of the conveyors 34 and 36 is formed of a resilient material in the same manner as the exterior surfaces of conveyor 22 and pulleys 32 and 33 to obviate damage to the tender vegetable being processed. The plate or table 45 supports the vegetable while it is being cut and helps guide the cut vegetable to station C.

The broccoli cut into halves is fed from the operating station B to the operating station C where the halves are retained between a pair of cooperating conveyors 44 and 46. The conveyors 44 and 46 are formed of endless flexible belts with suitable external coverings of soft resilient material, as were the conveyor belts 22, 34 and 36. The conveyor 44 is trained over rollers 48 and 49, and the conveyor belt 46 is trained over rollers 50 and 51. The conveyors 44 and 46 have cooperating flights movable in parallel planes to retain the broccoli and carry it to the right as viewed in FIG. 1 where the broccoli may be cut into quarters lengthwise by the cutter means 53. FIG. 4 is illustrative of the broccoli 12 being cut into quarters 12d, 12e, 12f, 12g by cutter means 53 and FIG. 5 shows a broccoli cut into the separate quarter sections 12d, 12e, 12f and 12g.

Referring now to FIGS. 6 and 7, there is illustrated the butt end cutting station A. The components at the operating station A are supported upon a suitable framework indicated generally by the numeral 56. The framework includes a plurality of frame sections 58. Likewise, the shaft 62 for the roller 17 is suitably journaled on frame sections 58.

The frame 56 includes a plurality of uprights 63, 64 and 65 extending upwardly from frame sections 57 and 58. The shafts 68 and 69 for the rollers 24 and 26, respectively, which support endless belt 22, are suitably supported from the upright 63 and 65, respectively.

The drive means for the belts 22, 20 and 14 are comprised of an electric motor 70 supported on a leg 59 of the frame 56, a gear reduction unit 71 driven by the motor 70 and operatively connected to drive sprockets 72 and 73 on the shaft 60 by means of a chain 74. Chain 75 is trained over sprocket 73 on shaft 60 and sprocket 76 on stub shaft 78. The chain 75 is in engagement with the sprocket 80 on the shaft 68 for driving the roller 24 so as to rotate the endless belt 22. The conveyors 14, 20 and 22 are driven from the single motor 70 by means of interconnected drive means so as to correlate the rotation and movement of the broccoli carried on the respective conveyors.

A hold down plate 22a applies pressure to hold the lower flight of belt 22 down. Adjustable feed gauge 18 is not shown in FIG. 6, and it will be understood that a stationary guide may be used to gauge the length of butt cut, though the rotatable belt type construction is preferred.

As shown in FIGS. 6, 7 and 9, the cutter means 28 for suitably cutting the butt end from the broccoli stem 12 comprises an endless belt saw or cutter 82 having either a plurality of teeth along one edge (as shown) or a knife edge. The belt saw is trained about upper pulley 83 and lower pulley 84. The lower pulley is rotatably journaled on a shaft 85 upon which is carired a second pulley 86 operatively connected to the drive motor 88 by belt 89. The motor is rigidly secured to a cross piece 90 of the frame means 56. The shaft 91 which journals the upper pulley 83 is carried on the upright 64, which is secured at its lower end to a transverse frame member 66. As best seen in FIG. 9, the band saw 82 is disposed between the conveyor 22 and the conveyor 14 so as to cut the butt end of the stalk of the broccoli 12 (as indicated in FIG. 2). The upper flights of the conveyors 14 and 20 are supported by the channel sections 94 and 95 respectively. The endless belt 14 is comprised of a flexible strip joined at the ends, such flexible strip being made of rubber or plastic reinforced with plastic or natural fibers. The belts 20 and 22 are each fabricated from a flexible backing strip similar to conveyor 14 and in addition belts 20 and 22 have provided on the exterior surface thereof a thickness of a sponge-like resilient material, as for example, a polyurethane foam or a foam rubber for cushioning the vegetable retained between the cooperating conveyors in such manner as not to bruise or damage the tender heads of the broccoli.

Referring to FIG. 8, there is best shown the drive means for the endless band saw 82. The motor 88 is secured on frame 56. The pulleys 86 and 84 are mounted for conjoint rotation on sleeve 85 which is journaled on shaft 81. Shaft 81 is connected at one end to bracket 87 which is secured to the cross brace 90' of the frame 56. Secured to the end of the shaft of motor 88 is pulley 92 that is drivingly connected to pulley 86 by means of belt 89. It will be evident that upon rotation of motor 88, the belt 89 will be actuated to rotate the pulleys 84 and 86 carried on the sleeve 85 for driving the band saw 82. It will be appreciated by those skilled in the art that a circular saw without a serrated edge may be used in place of the endless band saw 82 to cut the butt end from a broccoli stem.

The broccoli 12 is carried between the conveyor 22 and 14 for severing the butt end from the stalk and the cut broccoli is then delivered to the operating station B of the vegetable cutting machine 10. The second operating station is indicated generally in dotted line in FIG. 7 to show the operative relationship of components and is shown in further detail in FIGS. 10 and 11. From the conveyors 14 and 22, the broccoli is deposited onto the horizontally disposed endless conveyor 30 of operating station B. A guide plate 101 extends below conveyor 22 for guiding broccoli rearwardly and a guide plate 102 is disposed above the conveyor 30 for preventing broccoli from spilling over the end of the conveyor 30 during the transfer process from operating station A. The broccoli carried on the conveyor 30 passes between the driven pulleys 32 and 33 having resilient exterior surfaces which may be formed in the same manner as the exterior surface of conveyor 22. The pulleys 32 and 33 function to align the broccoli longitudinally on the conveyor belt 30 prior to feeding of the broccoli between the cooperating flights of conveyor belts 34 and 36. The rollers 39 and 40 are affixed to shafts 104 and 105 which are journaled on the frame 108 which supports the operating components at operating station B. The frame 108 includes a plurality of frame sections 109 supported on the legs 110. Disposed horizontally on the frame sections 109 and forming part of the frame 108 is a horizontal plate member 112 having an opening therein for the endless conveyor belt 30, which is trained over rollers 29 and 31.

Carried on a bracket 114 of the frame 108 is an electric drive motor 116 which provides the source of power for driving the guide pulleys 32 and 33, the conveyor 30 and the cooperating conveyors 34 and 36 which support the broccoli therebetween. The motor 116 also provides the drive for the conveyors 44 and 46 at operating station C as will be more fully described later.

As seen in FIGS. 10 and 11, the electric drive motor 116 is affixed on a bracket 114 supported on the cross brace 118 of the frame 108. The drive pulley 120 is driven by the motor 116 through a gear reducer 122. Drive belt 126 drivingly engages drive pulley 120 with the driven pulley 124, which is mounted on a shaft 125 journaled in the frame 108.

Secured to the shaft 125 is a sprocket 128 which is operatively connected to sprocket 129 on shaft 130 by chain 131. Sprocket 135, which is secured on the shaft 130 adjacent to the top thereof, is operatively connected to sprocket 133 on shaft 134 by a chain 136. The shaft 134 is journaled in bracket 138 of frame 108. Secured to the lower end of shaft 134 below sprocket 133 is a bevel gear 140 which cooperates with a bevel gear 141 on horizontally-disposed cross shaft 142. The cross shaft 142 is journaled on frame 108.

Affixed at one end of cross shaft 142 is a sprocket 144 which is operatively connected by chain 148 to sprocket 146 that is secured to the lower cross shaft 147. The chain 148 is trained over a sprocket 150 on shaft 152 for rotating shaft 152. Also carried on the shaft 152 is a drive sprocket 154 which is operatively connected to a driven sprocket 156 on shaft 158 by the chain 159 for driving the roller 31. Since conveyor 30 is disposed about the rollers 29 and 31, rotation of roller 31 will cause movement of conveyor 30.

The rotation of the shaft 130 will cause rotation of the roller 42 carried thereon. Rotation of the shaft 125 will cause rotation of the roller 43 carried thereon. Rotation of the rollers 42 and 43 will cause rotation of the conveyor 36 which is trained over the three rollers 41, 42 and 43. The roller 41 is thereby driven causing rotation of the shaft 160 to which the roller 41 is secured. The sprocket 161 on the shaft 160 is connected to the sprocket 162 on the shaft 163 for driving the guide in pulley 33. The drive motion is transmitted from shaft 160 to the shaft 104 by means of chain 165 which is trained over sprocket 166 secured to shaft 104 and idler sprockets 168 and 170 journaled in bracket 169 affixed on frame 108. The guide in pulley 32 is driven by a chain 172 trained over sprocket 166 on shaft 104 and sprocket 174 on shaft 176.

The operating station B includes a cutter mechanism 38 which comprises a housing 178 secured at its lower end to cross brace 179 on frame 108. Disposed within the housing 178 is an upper pulley 180 and a lower pulley 181 having a band saw 182 journaled thereon. Secured to the shaft 183 which also carries pulley 181 is a driven pulley 184 which is operatively connected to a drive pulley 185 on the motor 186 by a belt 187. It will be clear that upon actuation of motor 186, the drive pulley 185 will rotate, causing movement of the belt 187 and rotation of the pulley 184, in turn causing rotation of shaft 183 and pulley 181 carried thereon to drive the endless saw blade 182. As best seen in FIG. 10, the band saw 182 is disposed between the cooperating vertically oriented flights of the conveyors 34 and 36 so as to longitudinally cut the broccoli being carried and held between the resilient surfaces of the cooperating flights of conveyors 34 and 36.

At the operating station B, the broccoli is retained between the cooperating vertically oriented flights of conveyors 34 and 36 and the cutter or band saw 182 effects a longitudinal slicing or halving of the broccoli. From operating station B, the broccoli halves are passed on to operating station C. Operating station C is carried on the same frame as operating station B and is comprised of a pair of conveyors 44 and 46 which have parallel cooperating flights disposed at an angle with respect to a horizontal plane. It has been found that this angle is critical in order to properly maintain the broccoli in position between the cooperating flights of conveyors 44 and 46 for effective quartering of each broccoli stem. In a preferred form of the invention, the angle of inclination between a horizontal plane and planes passing along the outer surfaces of the flights between the conveyors is set at 11 degrees and may be on the order of 5 to 16 degrees to accommodate different sizes of broccoli.

Suitable adjustment means 171 are provided to accommodate tilting of the frame supporting the components of station C with respect to the components of station B. The adjustment may be done by pivoting a portion of the top of frame 108 as indicated at 173 and forming two legs 110 of telescoping portions adjustable joined by fasteners 175 which engage within selected openings 177.

The upper conveyor belt 44 at operating station C is trained over a pair of rollers 48 and 49 which are carried on shafts 142 and 182, respectively. As indicated above, the shaft 142 is driven by the electric motor 116 by means including the belt 126, chains 131 and 136 and bevel gears 140 and 141. The shafts 142 and 182 are journaled in a framework 184 which extends rearwardly from the frame 108 and forms a part thereof.

The rollers 50 and 51 over which the lower endless belt 46 is trained, are carried on shafts 152 and 187 which are journaled in frame 186 which is secured to the rear of frame 108 and forms a part thereof. The roller 50 and 51, respectively, are secured to the shafts 152 and shaft 187 respectively for rotation therewith. Thus, upon rotation of the shaft 152, the roller 50 thereon will be rotated, and the conveyor 46 will be driven. The conveyors 44 and 46 are constructed and arranged such that they will rotate in opposite directions at the same rate of speed for carrying the broccoli sections therebetween such that the broccoli sections can be properly quartered by means of the cutter means 53.

The cutter means 53 at operating station C comprises a transverse cross brace 188 secured to frame 108. Affixed to one end of the cross brace 188 is a bracket 189 carrying a motor 190 thereon. The motor 190 drives a pulley 191 which is operatively connected to a larger pulley 192 on the shaft 193 by means of a belt 194. Pulley 195 is rotatively journaled on the shaft 193 and operatively connected to the pulley 192 so as to be driven thereby. Also carried on the cross brace 188 is a shaft 198. Pulley 199 is carried rotatably on the shaft 198 and the band saw 200 for longitudinally quartering the broccoli carried between the conveyors 44 and 46 is trained over the pulleys 195 and 199. The lower flight of the band saw 200 is disposed between the parallel cooperating flights of conveyor belts 44 and 46.

The drives for the conveyors are correlated and timed so as to provide for a continuous movement of broccoli from operating station A, through operating stations B and C. By virtue of mounting continuous cutter blades or band saws at operating stations B and C operative between the cooperating flights of the pair of conveyors, a high rate of production is attained while maintaining a uniform high quality product.

The operation of the vegetable cutting machine of the present invention will now be summarized. Broccoli is fed into the vegetable cutting machine 10 at operation station A. The broccoli is carried on a flexible endless conveyor belt 14 which has a substantially horizontal upper flight. Conveyor 22 which is comprised of a flexible strip having a resilient covering thereon for cushioning the broccoli so as to prevent damage thereto cooperates with the flexible belt 14 to retain each broccoli stem 12 therebetween. The cutting means 28, which is preferably an endless band saw, cuts the butt end from the stalk of each broccoli stem. The broccoli passes from operating station A onto the conveyor 30 at operating station B. The conveyor moves the broccoli rearwardly in the machine and the broccoli is properly oriented on the belt 30 by means of the driven pulleys 32 and 33. The broccoli passes between the vertically disposed cooperating flights of conveyors 34 and 36. Disposed between the cooperating flights is an endless band saw blade 182 which effects a longitudinal slicing or halving of the broccoli. The cut broccoli passes from the operating station B to the operating station C.

Operating station C includes a pair of cooperating conveyors 44 and 46 having cooperating flights disposed in parallel planes and oriented at an angle with respect to a horizontal plane. The angle is critical and preferably on the order of 5 to 16 degrees to assure proper orientation of the broccoli prior to the quartering operation which is performed by the cutter blade or band saw 200.

There has been provided by the present invention an automated broccoli cutting machine which is capable of cutting the broccoli stems in half and then in quarters so as to produce a uniform product of high quality and at a high rate of production. The quartered broccoli is in suitable form for freezing or the like.

While there has been shown a presently preferred form of the present invention, it will be understood that the invention is not limited thereto since it may be otherwise embodied within the scope of the claims which follow. For example, the outer resilient covering of the conveyors 22, 34, 36, 44 and 46 may be fabricated from a flexible belt having a plurality of springs or fingers extending outwardly therefrom, with a flexible surface or skin made of a material, such as nylon, which will provide the spongy flexible surface to hold broccoli or like vegetable without damaging the head of the vegetable.

I claim:

1. A vegetable cutting machine for cutting elongated vegetables into lengthwise quarters comprising an operating station including first conveying means for receiving and conveying said vegetable and first cutting means associated with said first conveying means for cutting said vegetables in half lenghwise, and another operating station including second conveying means for receiving and conveying said vegetables, and second cutting means associated with said second conveying means for cutting said vegetables in quarters lengthwise, said first and second conveying means each comprising cooperating pairs of conveyors and said first and second cutting means each being disposed between an associated pair of conveyors for effecting cutting of said vegetables carried by said associated pair of conveyors.

2. A vegetable cutting machine as in claim 1 including a vegetable end-cutting station provided with additional conveyor means for receiving and conveying vegetables to be processed to said first conveying means with one end of said vegetable projecting from one edge of said additional conveyor means and end cutting means adjacent said one edge of said additional conveyor means for cutting the ends of said vegetables.

3. A vegetable cutting machine as in claim 1 wherein said first conveying means includes a pair of elongated cooperating conveyors each having a flight mounted for movement substantially in a vertical plane and said second conveying means includes a pair of elongated cooperating conveyors each having a flight mounted for movement in parallel planes inclined downwardly from a horizontal plane.

4. A vegetable cutting machine as in claim 3 including third conveying means for receiving and conveying vegetables to said first conveying means, said third conveyor means including a pair of elongated cooperating conveyors each having a flight mounted for movement in a substantially horizontal plane.

5. A vegetable cutting machine as in claim 3 wherein each of said conveyors includes an elongated belt trained over at least a pair of rollers, the outer surface of each conveyor being comprised of resilient material so as to permit the vegetables to be retained between adjacent cooperating flights of said cooperating conveyors without undue squeezing or damage to the vegetables.

6. A vegetable cutting machine as in claim 1 wherein said first and second cutting means are comprised of elongated, continuous cutting belts having a portion disposed between adjacent cooperating conveyors and acting on the vegetables carried between said adjacent cooperating conveyors.

7. A vegetable cutting machine as in claim 3 wherein said first conveying means includes a third conveyor having a flight disposed for movement in a substantially horizontal plane below said pair of elongated cooperating conveyors having adjacent flights closely spaced for movement in parallel vertical planes.

8. A vegetable cutting machine as in claim 7 wherein said third and first conveying means are aligned longitudinally, and guide means are provided between said third and first conveying means for guiding vegetables having butt ends removed by said end cutting means onto said third conveyor.

9. A vegetable cutting machine as in claim 8 including frame means supporting said first and second conveying means and wherein cooperating pulleys are provided on said frame means for longitudinally positioning vegetables on said third conveyor prior to entry of such vegetables between the pair of cooperating conveyors of the first conveying means.

10. A vegetable cutting machine as in claim 3 wherein the pair of cooperating conveyors of said second conveying means have closely spaced flights for engaging the vegetable cut in half lengthwise by the first cutting means and conveying same at an angle of about 5 to 16 degrees with respect to a horizontal plane toward the second cutting means for cutting the vegetable into lengthwise quarters which are uniform.

11. A vegetable cutting machine as in claim 10 wherein the angle of inclination of said closely-spaced flights of the conveyors is 11 degrees.

References Cited

UNITED STATES PATENTS

| | | | |
|---|---|---|---|
| 2,420,776 | 5/1947 | Hanna | 83—201 |
| 2,698,037 | 12/1954 | Shaw | 146—73 |
| 2,978,003 | 4/1961 | Benekam | 146—98 X |

W. GRAYDON ABERCROMBIE, Primary Examiner

U.S. Cl. X.R.

146—81